Feb. 21, 1950     H. A. JAMES     2,497,993
AXIALLY MOVABLE PISTON TYPE HYDRAULIC CLUTCH
Filed Jan. 30, 1946     3 Sheets-Sheet 1
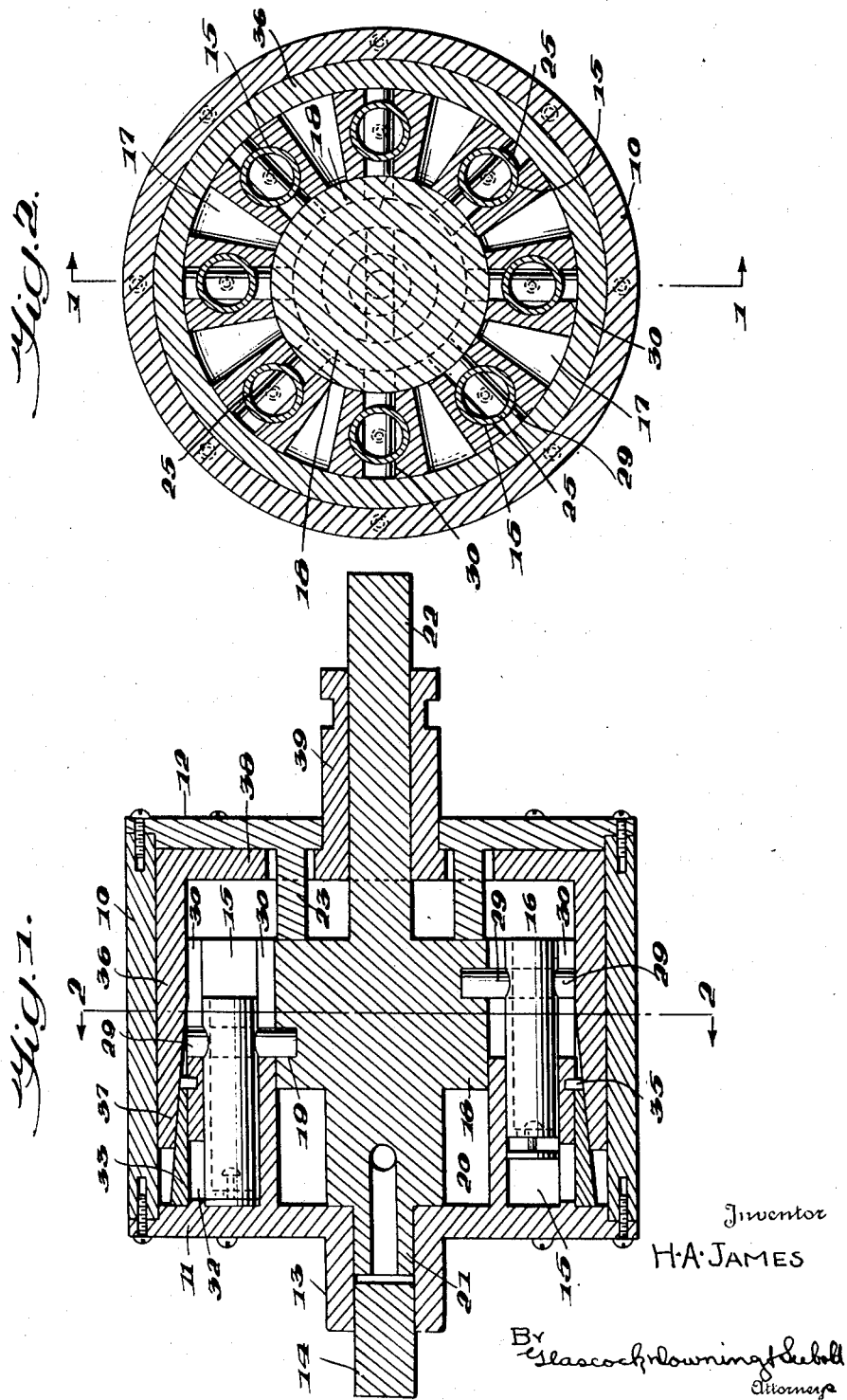
Inventor
H·A·JAMES Feb. 21, 1950 H. A. JAMES 2,407,993
AXIALLY MOVABLE PISTON TYPE HYDRAULIC CLUTCH
Filed Jan. 30, 1946 3 Sheets-Sheet 2
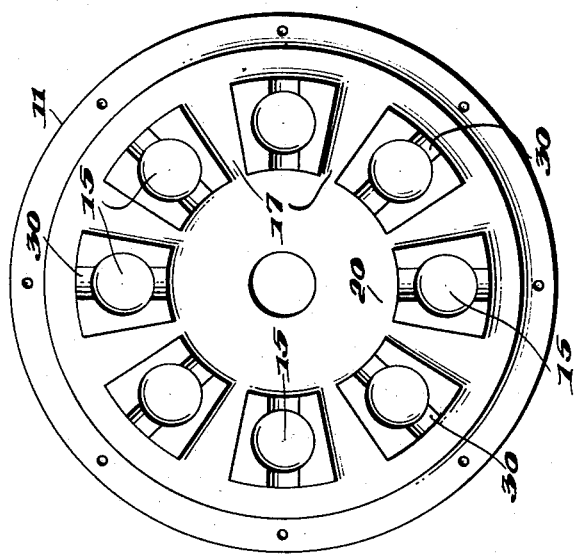
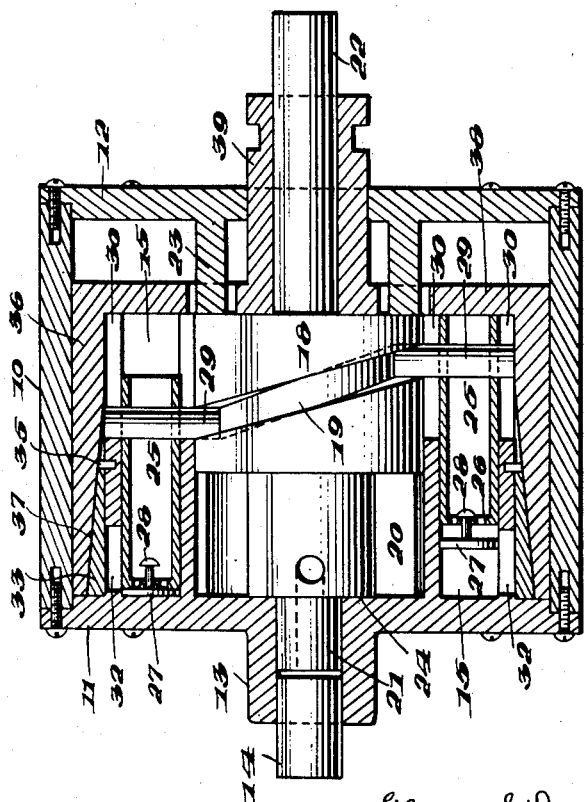
Inventor
H. A. JAMES
By Glascock, Downing & Seebold
Attorneys Feb. 21, 1950 H. A. JAMES 2,497,993
AXIALLY MOVABLE PISTON TYPE HYDRAULIC CLUTCH
Filed Jan. 30, 1946 3 Sheets-Sheet 3
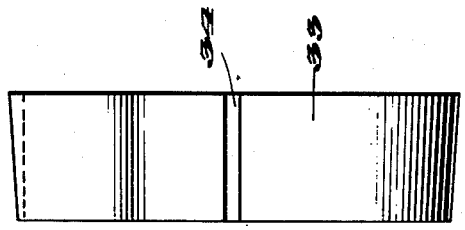
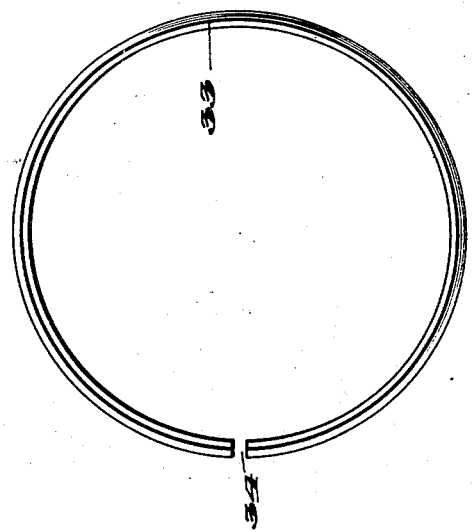
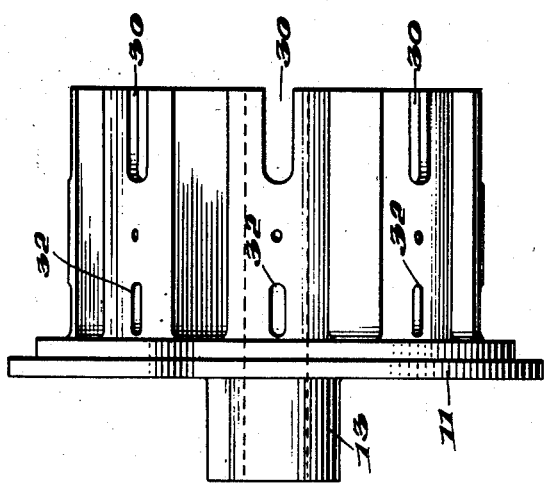
Inventor
H. A. JAMES
By Glascock Downing Siebold
Attorneys Patented Feb. 21, 1950

2,497,993

UNITED STATES PATENT OFFICE 2,497,993

AXIALLY MOVABLE PISTON TYPE
HYDRAULIC CLUTCH

Herbert A. James, Philadelphia, Pa.

Application January 30, 1946, Serial No. 644,382

5 Claims. (Cl. 192—59)

This invention relates to an axially movable piston type hydraulic clutch, and has for its object to provide an improved control device for variably regulating the flow of the fluid medium to vary the relative speed of the drive and driven elements.

A further object is the provision of a clutch and transmission embodying simple and practical structural characteristics which simplify the construction and minimize vibration incident to the operation thereof.

In the accompanying drawings wherein an improved embodiment of the invention is illustrated—

Figure 1 is a longitudinal sectional view through the hydraulic clutch and power transmission, taken on the line 1—1 of Figure 2, Figure 2 is a transverse sectional view taken on the line 2—2 of Figure 1, Figure 3 is a longitudinal sectional view similar to Figure 1, but showing the cam drum in elevation, Figure 4 is a detail end view of one of the end walls of the casing showing the arrangement of the cylinders removed, Figure 5 is a side elevation of the part shown in Figure 4, Figure 6 is an edge elevation of the fluid control ring removed, Figure 7 is a side view of the ring, and Figures 8 and 9 are side and end elevations, respectively, of one of the pistons and the related check valve removed.

Referring to the drawing in detail, the numeral 10 indicates a hollow cylindrical casing having end walls 11 and 12, one of which is provided with a coupling sleeve 13 for attachment to a shaft 14 whereby rotary motion is imparted to the casing 10 and the latter constitutes the driving element of the transmission. Internally the casing 10 is formed with a circular series of spaced projections having longitudinal bores and constituting the cylinders 15. The cylinders 15 are of less length than the distance between the end walls 11 and 12 and thus provide a chamber 16 at one extremity. The chamber 16 is in communication with the adjacent open ends of the cylinders 15 and also with the spaces 17 between the cylinders.

A drum 18 is rotatably mounted within the circular series of cylinders 15 and is closely fitted in position to provide a fluid tight joint therewith. Externally the drum 18 is formed with an endless cam groove 19 and the drum is reduced in diameter at one end adjacent the end wall 11 to provide a chamber 20. The extremity of the drum 18 is further reduced as indicated at 21 and rotatably supported in the coupling sleeve 13. The opposite extremity of the drum is formed integral with the driven shaft 22 projecting externally of the casing 10 through the end wall 12. The latter is provided with a segmental flange 23 engaging the adjacent end of the drum 18. The drum is held against movement axially in the casing partly by the segmental flange 23 and partly by the shoulder 24 engaging the end wall 11.

The hollow pistons 25 are slidably mounted in the bores of the cylinders 15 and the ends adjacent the end wall 11 are closed and provided with ports 26 coacting with check valves 27 slidably mounted on the pistons by guide stems 28. The opposite open ends of the pistons face the end wall 12 of the casing and are provided with pins 29 slidable in diametrically opposed slots 30 in the walls of the cylinders and engaged at their inner extremities in the cam groove 19 whereby during relative rotation of the casing 10 and the drum 18 the pistons are caused to move back and forth in the cylinders to an extent which is determined by the pitch of the cam groove 19.

The closed ends of the cylinders 15 adjacent the end wall 11 are provided in the outer portions thereof with ports 32 and the split ring 33 is arranged about the series of cylinders and formed with a slit 34 permitting the ring to be contracted and in so doing to be closely applied to the ports 32 and prevent the passage of fluid therethrough. Normally the split ring is expanded to such extent as to lie in spaced relation to the ports 32 and thereby permit the free flow of fluid therethrough. The split ring is held against axial movement in the casing by pins 35 engaging recesses in the cylinders 15.

The diameter of the split ring 33 is varied to regulate the flow of fluid through the ports 32 by axial adjustment of a sleeve 36 slidably fitted within the casing 10 and provided with an internally beveled end 37 engaging the correspondingly inclined outer surface of the split ring 33. Thus, as the sleeve 36 is moved away from the split ring 33 the latter is allowed to expand by its inherent resiliency, whereas when the sleeve is moved in an opposite direction the split ring is caused to contract and thereby reduce the area of discharge of the ports 32.

The sleeve 36 is provided within the chamber 16 with a web portion 38 connected with a hub 39 projecting through the end wall 12 and provided externally thereof with a groove engaging the collar of an adjusting lever (not shown) whereby the position of the sleeve 36 and the fluid control ring 33 may be adjusted as desired.

In operation when the sleeve 36 is moved axially to contract the split ring 33 the latter closes communication between the closed ends of the cylinder bores. The chambers 16, 17 and 20 thereby form fluid locks opposing an axial movement of the pistons 25 and causing the rotary movement of the casing to be transmitted directly to the drum 18 and driven shaft 22. In other positions of adjustment of the sleeve 36 the split ring 33 is permitted to expand and in so doing the ports 32 are variably uncovered thereby varying the fluid resistance to the motion of the pistons 25 and transmitting the rotary movement of the casing 10 to the drum 18 at variable speed ratio depending upon the adjustment of the fluid control ring 33.

What I claim is:

1. In a power transmission, a casing, a series of cylinders in said casing having ports therein, a drum rotatably mounted within the casing and having a cam groove therein, valved pistons in said cylinders, pins carried by said pistons engaging in said groove, said casing forming a chamber communicating with the cylinder ports, said series of cylinders and said casing being arranged to provide an annular space therebetween, and means mounted for combined radial and axial movement in said space for variably regulating the passage of fluid between said ports and said chamber.

2. In a power transmission, a casing, a series of cylinders in said casing having ports therein, a drum rotatably mounted within the casing and having a cam groove therein, valved pistons in said cylinders, pins carried by said pistons engaging in said groove, said casing forming a chamber communicating with the cylinder ports, a fluid control member contractable about the series of cylinders for controlling the passage of fluid between said ports and said chamber, and means for varying the diameter of said contractable means.

3. In a power transmission, a casing, a series of cylinders in said casing having ports therein, a drum rotatably mounted within the casing and having a cam groove therein, valved pistons in said cylinders, pins carried by said pistons engaging in said groove, said casing forming a chamber communicating with the cylinder ports, a fluid control member contractable about the series of cylinders for controlling the passage of fluid between said ports and said chamber, means retaining said contractable member against axial movement with relation to said cylinders, and means for variably contracting said member.

4. In a power transmission, a casing, a series of cylinders in said casing having ports therein, a drum rotatably mounted within the casing and having a cam groove therein, valved pistons in said cylinders, pins carried by said pistons engaging in said groove, said casing forming a chamber communicating with the cylinder ports, a fluid control member contractable about the series of cylinders for controlling the passage of fluid between said ports and said chamber, and sleeve axially movable in the space between the cylinders and the casing and coacting with the contractable member for varying the diameter thereof.

5. In a power transmission, a casing, a series of cylinders in said casing having ports therein, a drum rotatably mounted within the series of cylinders and having a cam groove therein, valved pistons in said cylinders, pins carried by said pistons engaging in said groove; said casing forming a chamber communicating with the cylinder ports, a fluid control member contractable about the series of cylinders for controlling the passage of fluid between said ports and said chamber, and sleeve axially movable in the space between the cylinders and the casing and coacting with the contractable member for varying the diameter thereof, and means preventing axial movement of the contractable member within the casing.

HERBERT A. JAMES.

REFERENCES CITED

The following references are of record in the file of this patent:

UNITED STATES PATENTS

| Number | Name | Date |
|---|---|---|
| 1,028,522 | Adams | June 4, 1912 |
| 1,421,639 | Wheeler | July 4, 1922 |

FOREIGN PATENTS

| Number | Country | Date |
|---|---|---|
| 285,452 | Italy | May 12, 1931 |